J. PERKINS & W. H. BURNETT.
MACHINE FOR BENDING METAL PIPE.
No. 814. Reissued Sept. 20, 1859.
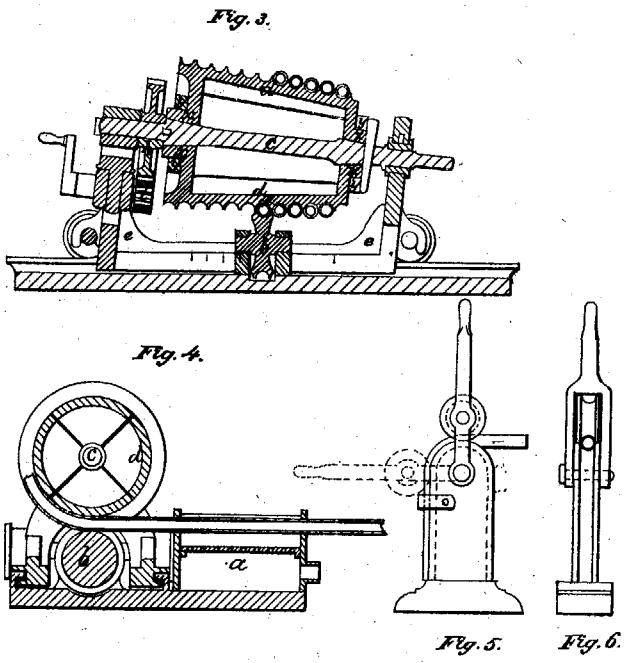
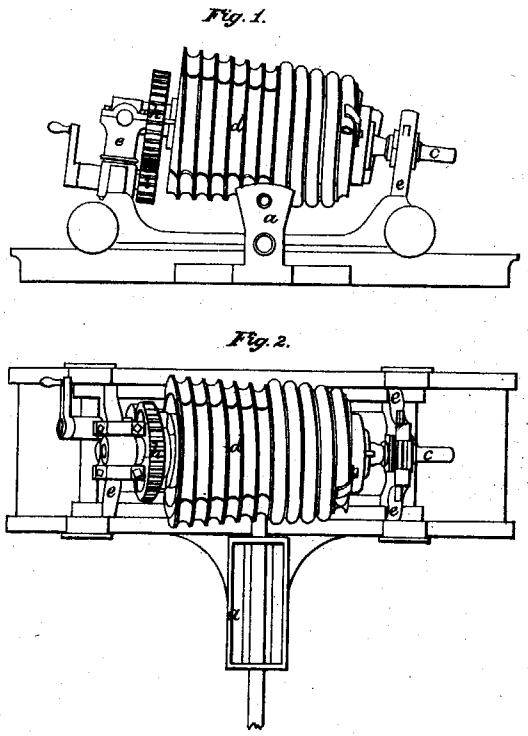
Witnesses.
Inventors
James Perkins
William H. Burnet

UNITED STATES PATENT OFFICE.

JAMES PERKINS AND WILLIAM H. BURNET, OF NEWARK, NEW JERSEY.

IMPROVED MACHINE FOR BENDING METAL PIPE.

Specification forming part of Letters Patent No. 15,899, dated October 14, 1856; Reissue No. 814, dated September 20, 1859.

*To all whom it may concern:*

Be it known that we, JAMES PERKINS and WILLIAM H. BURNET, of the city of Newark, in the county of Essex and State of New Jersey, have invented certain new and useful Improvements in Machinery for Bending Metal Pipes into Coils; and we do hereby declare that the following to be a full, clear, and exact description thereof, reference being had to the accompanying drawings, in which—

Figure 1 is a side elevation. Fig. 2 is a plan. Fig. 3 is a longitudinal section. Fig. 4 is a cross-section on the line of the roller and furnace. Figs. 5 and 6 modifications for making a simple bend on a pipe.

The nature of our invention consists in combining a mandrel or former with a roller or guide so as to bend a pipe of iron or other metal either hot or cold into the form of a coil or curve without collapsing it or destroying its cross-sections.

The construction of one form of the apparatus shown in the drawings is as follows: We arrange a furnace, *a*, of sufficient length to heat the pipe properly while passing through it. The pipe enters the furnace through an opening and passes out through another in the opposite end of the furnace, as clearly seen in Figs. 2 and 4. Just in front of the furnace we place a roller, *b*. This roller has a semicircular groove in it around its periphery, as plainly seen at Fig. 3. In this modification the roller *b* is in stationary bearings, and just over it there is a former on an axis, *c*. This former or mandrel is lettered *d*. It is made of metal, and is either cylindrical or conical, as represented in Figs. 1, 2, and 3. Around the exterior of this former *d* a semicircular groove is turned spirally from end to end, and the circumference is divided into quarters by radial points parallel with its axis. A collar projects from it around the axis at *x x*, which is embraced by a collar or ring, *y y*. The axis *c* is made conical where it passes through the collars of the former, so that by driving it in it forces the segments out till the rings *y y* bind and hold them. This mandrel or former is held in bearings in a carriage, *e e*, which moves along in front of the furnace as the coil is formed. This former or mandrel axis has a spur-wheel, *h*, on it driven by a pinion, *i*, turned by any power or prime mover. It may not be necessary to have the former in sections when of a cone form in order to deliver the coil of pipe therefrom, but with the cylindrical former this is necessary in most cases. The two semicircles or grooves in the surface of the former and roller *b* or guide form an entire circle just at the point where the pipe is being bent, and there entirely surround it and prevent it from collapsing or becoming destroyed in its cross-section during the process of bending.

To put this machine into operation, we take the iron or other wrought pipe to be bent, and, if it requires to be heated, pass it through the furnace, and thence between the roller *b* and former *d*. We affix the end of the pipe to the former and by revolving the former the pipe is coiled around it in the spiral form of the groove in which it is laid. This spiral, it will be observed, causes the carriage to advance as the coil is wound on. When the coil is formed, the mandrel-axis *c* is driven back, and thus causes the former to collapse, frees the pipe, and the coil is then removed.

It is obvious that the former can be made stationary and the roller be made to work around it with a similar result. This is shown in Figs. 5 and 6 for making bends in pipes.

The operation is so obvious it needs no further description.

Having thus fully described our invention, what we claim as new therein, and desire to secure by Letters Patent, is—

The mandrel *d*, substantially as herein described, and therewith the traversing roller *b*, or its equivalent, for bending coils of metal pipe, and in combination therewith the furnace, in the manner and for the purposes set forth.

JAMES PERKINS.
WILLIAM H. BURNET.

Witnesses:

R. A. HAN GILSON.
S. S. BURNET, Jr.